Sept. 21, 1965
R. V. SMITH, JR
3,206,797
RECIPROCATING MACHINE FOR BREAKING
BIVALVULAR SHELLS FOR SHUCKING
Filed Dec. 6, 1963
2 Sheets-Sheet 1
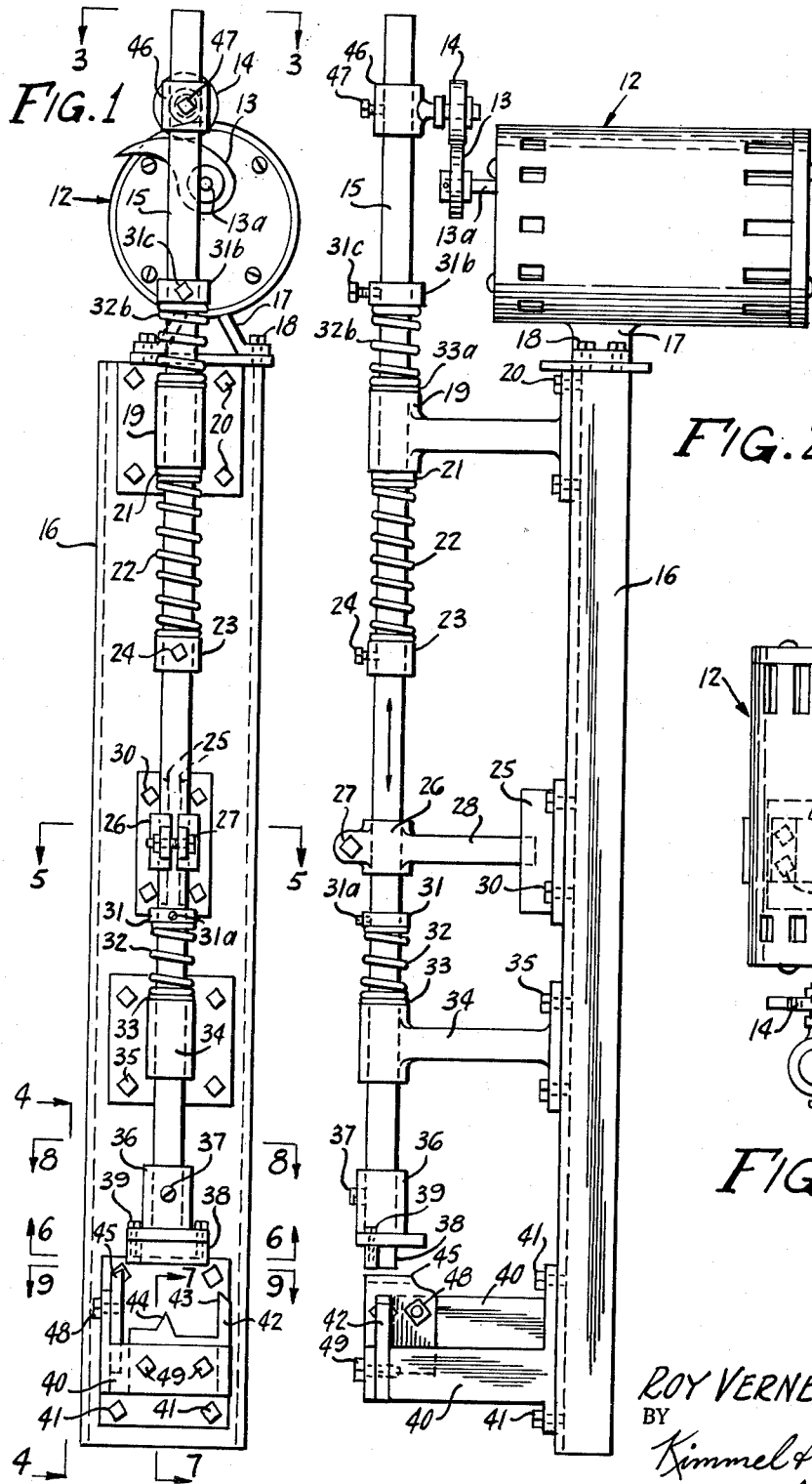
INVENTOR.
ROY VERNE SMITH, JR.
BY
Kimmel & Crowell
ATTORNEYS.

Sept. 21, 1965 R. V. SMITH, JR 3,206,797
RECIPROCATING MACHINE FOR BREAKING
BIVALVULAR SHELLS FOR SHUCKING
Filed Dec. 6, 1963 2 Sheets-Sheet 2

INVENTOR.
ROY VERNE SMITH, JR.
BY
Kimmel & Crowell
ATTORNEYS.

United States Patent Office 3,206,797
Patented Sept. 21, 1965

3,206,797
RECIPROCATING MACHINE FOR BREAKING BIVALVULAR SHELLS FOR SHUCKING
Roy V. Smith, Jr., 58 17th St., P. O. Box 452, Apalachicola, Fla.
Filed Dec. 6, 1963, Ser. No. 328,730
3 Claims. (Cl. 17—9)

This invention relates to a machine for preparing oyster shells and the like for shucking.

Generally, the method of preparing an oyster shell for shucking or breaking the edge of the shell has in the past been performed manually with hammer and break block. For example, the edge of the oyster shell is placed flat on the chisel-shaped anvil with the lip of the shell extended over the edge of the chisel anvil. The butt, or large hinged end of the shell of the oyster is firmly grasped with one hand while the other hand of the shucker raises a hammer for the blow. Then the hammer is brought down, breaking the lip from the shell and coming to rest on the break block supporting the anvil. The oyster meat is then knifed, or shucked from the shell completing the operation.

This means of breaking oyster shells is hazardous to the shucker's eyes because of flying shell chips and the like, and is also slow and tiring to the operator.

To overcome the above difficulties and problems, a reciprocating or hammer type of machine was devised for this purpose. The present invention, in general, consists of a motor powered cam operated reciprocating shaft and hammer assembly which has cutting blades to strike the oyster shell placed on the cutting blades held by a cooperating anvil.

The primary object of this invention is to effectively break the edge of an oyster shell without being hazardous to the eyes of the operator.

Another object of the invention is to provide a breaking machine which will increase the shucking output for canning or preparing oysters.

A further object of the invention is to provide a machine which will substantially eliminate the arduous task of hand breaking the edge of oyster shells preparatory to the shucking of the oyster from its native shell.

With these and other objects in view, the invention includes certain novel features hereinafter described with reference to the drawings which accompany and form a part of this specification.

FIGURE 1 shows a front view in elevation of the new machine;

FIGURE 2 shows a side view in elevation thereof;

FIGURE 3 shows a plan view of the machine;

Figure 9:
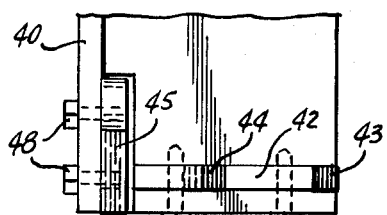
Figure 10:
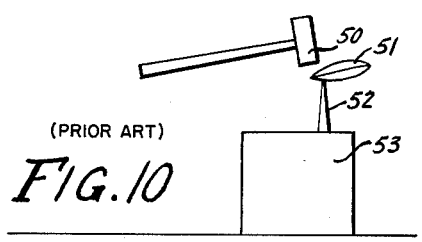

FIGURE 9 is an enlarged sectional view of the machine of the instant invention taken on lines 9—9 of FIG. 1 looking in the direction of the arrows; and FIGURE 10 illustrates the conventional state of the prior art in which a hammer, anvil and break block is employed manually by an oyster shucker to break off the edge of the oyster shell previous to the subsequent shucking of the oyster from its shell.

Referring to the drawings, wherein like reference numerals designate like parts, FIGURES 1 and 2 illustrate an exemplary embodiment of the invention in which motor means 12 is secured by mounting base 17 to frame 16 by plural bolt means 18. During operation, motor means 12 by conventional internal gear reduction means (not shown) turns lift cam means 13 on shaft means 13a at a desired rate of speed which contacts lift bearing means 14 secured to lift collar means 46. The collar means 46 is attached by screw means 47 to reciprocating shaft means 15 which terminates at its distal end in hammer means 36 secured thereto by screw means 37. Hammer means 36 carries cutter blade 38 by plural bolt means 39 and cooperates with cutter blades 42 held by anvil means 40.

Cutter blade 42 consists of hinge breaker 43 and splitting or dehinging tooth 44. Side breaker means 45 is also secured by bolt means 48 to anvil means 40. Anvil means 40 is secured by plural bolt means 41 to structural frame 16.

Shaft 15 is held in lateral position from frame means 16 by guide bearing 19 attached by plural bolt means 20 to frame means 16, and by bearing means 34 attached by plural bolt means 35 to frame means 16.

Guide means 25 is secured to frame means 16 by plural bolt means 30. A clamp member 26 is secured about shaft 15 and has a finger member 28 which coacts with guide means 25 to preclude rotation of shaft means 15 during its reciprocating coaction with anvil 40 while breaking an oyster shell.

Drive spring means 22 around shaft 15, during lifting of cam means 13 is tensioned between washer means 21 in contact with guide bearing 19, and adjusting collar 23 secured to shaft 15 by screw means 24. Rebound spring means 32 is in compresion between adjusting collar 31 attached to shaft 15 by screw means 31a with washer 33 in contact with bearing guide means 34 during rebound of shaft 15 during operation. An additional rebound spring means 32b is carried by shaft means 15 between washer 33a and an additional adjusting collar 31b having screw means 31c. FIGURE 3 is a view of the machine in plan which shows motor means 12 connnected to shaft 13a. Lift cam 13 is carried by shaft 13a which contacts and periodically lifts bearing 14 and lift collar 46 which is secured to shaft 15 by screw adjustment means 47.

Figure 4:
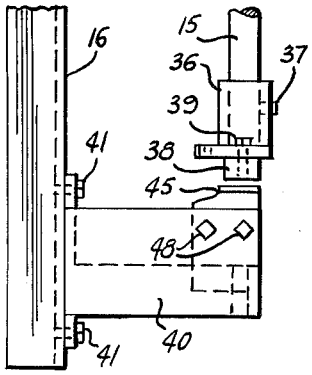
FIGURE 4 shows a sectional view of the machine of the instant invention taken on lines 4—4 of FIG. 1 looking in the direction of the arrows.

In FIGURE 4 a partial side view in elevation of frame 16 is shown. Shaft 15 is secured by screw means 37 to hammer means 36 which carries cutting blade 38. Anvil 40 carries side break 45 secured by bolt means 48 thereto.

Figure 5:
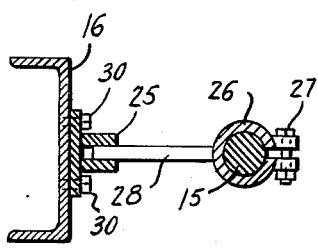
FIGURE 5 is a sectional view of the machine taken on lines 5—5 of FIG. 1 looking in the direction of the arrows.

FIGURE 5 shows a sectional view of shaft means 15, frame 16, and clamp means 26 in association with guide means 25, clamp means 26 carrying finger means 28 which rides in guide means 25.

Figure 6:
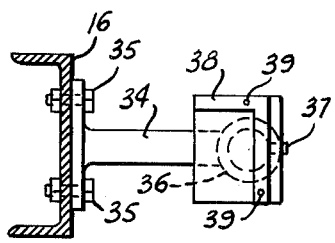
FIGURE 6 is a sectional view thereof taken on lines 6—6 looking in the direction of the arrow.

FIGURE 6 illustrates a sectional view of frame means 16 as assembled to bearing means 34 by bolt means 35 in association with cutting blade 38.

Figure 7:
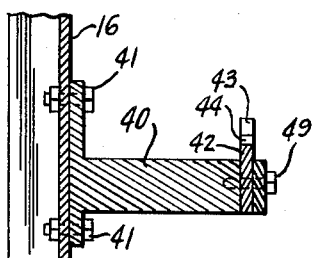
FIGURE 7 is a sectional view of the machine taken on lines 7—7 of FIG. 1 looking in the direction of the arrows.

In FIGURE 7 is seen a sectional view of frame means 16 and anvil means 40 secured together by bolt means 41 and a sectional view of cutting blade 42 secured to anvil means 40 by bolt means 49.

Figure 8:
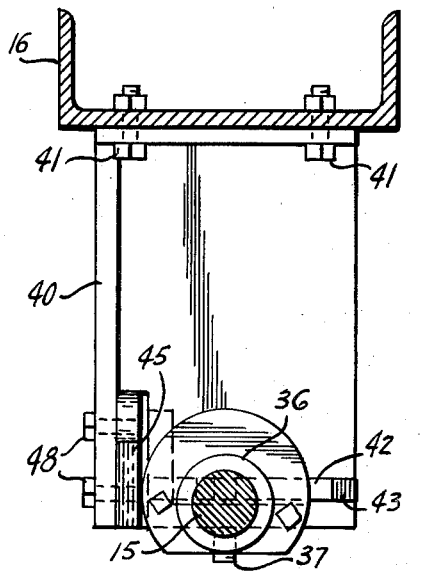
FIGURE 8 is an enlarged sectional view of the machine taken on lines 8—8 of FIG. 1 looking in the direction of the arrows.

FIGURE 8 shows a sectional view of frame means 16 being secured to anvil means 40 by bolt means 41 at a vertical position of FIGURE 1 where side break means 45 is attached to anvil means 40 by bolt means 48. Also shown in this FIGURE is a sectional view of shaft means 15 where hammer means 36 is attached thereto by screw means 37.

A partial view of anvil means 40 being assembled to splitting tooth means 44 and side break means 45 by bolt means 49 and 48, respectively, is shown in FIG. 9.

FIGURE 10 shows the conventional means for a shucker of the prior art, in which a hammer 50 is in position to cleave the edge from an oyster shell 51 positioned against a chisel edge 52 held by an anvil 53 preparatory to the subsequent opening of the oyster shell and shucking of the oyster from its shell.

Adjustments

Lift bearing 14 may be adjusted on shaft 15 by screw means 47 in lift collar 46. The compression of spring 22 may be adjusted by screw means 24 in adjusting collar 23, as shown in FIGS. 1 and 2. The compression of spring 32 may be adjusted by screw means 31a in adjusting collar 31. Spring 32b may be similarly adjusted.

Operation

To operate the new machine of the instant invention an unshucked oyster is placed on side break means 45 and hammer means 36 strikes the lip of the oyster shell, breaking it off for subsequent shucking of the oyster. During use, edge breaker 44 may be used to increase opening stubborn shells. That is, the oyster shell is placed on edge-lip end in towards the machine and hammer 36 strikes the top edge of the shell which spreads the shells for access of a knife. Edge breaker 44 may also be used for separating two or more oyster shells growing together or as a dehinging breaking means for butt shucking of the oyster. To use hinge breaker means 43 the oyster is grasped by lip end of shell and the butt end (hinged end) is placed on the sharp point of the edge break means 43 while hammer 36 strikes the butt of the inside shell, breaking the hinge, spreading the shell halves and forcing the shell butt down in a pivoting motion. Therefore, the eye of the oyster acts as a pivot, after which the oyster shell is parted by knife insertion at the butt end, which is known in the art as butt or heel shucking.

It should be understood, of course, that the foregoing disclosure relates to only a preferred embodiment of the invention and that it is intended to cover all changes and modifications of the invention herein chosen for the purposes of the disclosure, which do not constitute departures from the spirit and scope of the invention set forth in the appended claims.

I claim:

1. A machine for breaking oyster shells for shucking comprising structural body means, anvil means secured to said body means, reciprocating shaft means, guide means connecting said shaft means to said body means, hammer means carried by one end of said shaft means, cam lift bearing means attached to the other end of said shaft means, motor energizing means carried by said body means and including a shaft, lift cam means carried by the shaft of said motor means to cooperate with said lift bearing means on said shaft means, said anvil and hammer means cooperating to break an oyster shell for various methods of shucking oysters, spring means mounted on said reciprocating shaft means between fixed adjusting collars on said shaft means and said guide means attached to said body means, blade means carried by said hammer means, blade means carried by said anvil means to cooperate with the blade means on said hammer means, a guide member carried by said structural body means, and finger means carried by said shaft means to coact in said guide member to prevent said reciprocating shaft from turning during its reciprocating modes of operation.

2. A machine for breaking bivalvular shells comprising an elongated body structure including an anvil and a plurality of shaft guide means; reciprocating shaft means terminating at one end in a cam lift bearing and at the other end in a hammer means for cooperating with said anvil means; spring means mounted on said shaft means cooperating with said guide means, motor means including lift cam means to cooperate with said lift bearing means to reciprocate said shaft to break bivalvular shells between said hammer and anvil means, said spring means including drive spring means and rebound spring means mounted on said reciprocating shaft between adjustable bearing means mounted on said shaft and said guide means attached to said body means, means on said reciprocating shaft means and means carried by said body structure coacting to prevent said reciprocating shaft means from turning during its reciprocating modes of operation.

3. A machine as set forth in claim 2 including blade means mounted on said hammer means, and blade means mounted on said anvil means to coact with said hammer means to selectively break the bivalvular sections of the oyster shell at various desired points.

References Cited by the Examiner

UNITED STATES PATENTS

| | | | |
|---|---|---|---|
| 90,994 | 6/69 | Clareton | 146—65 |
| 130,745 | 8/72 | Reitz | 146—65 |
| 144,063 | 10/73 | Cleary | 17—9 |
| 998,482 | 7/11 | Elder | 146—12 |
| 1,342,689 | 6/20 | Pape | 146—12 |
| 2,299,311 | 10/42 | Dickerson | 17—9 |
| 2,354,928 | 8/44 | Ragupos | 17—45 |

SAMUEL KOREN, *Primary Examiner.*

LUCIE H. LAUDENSLAGER, *Examiner.*